B. WEINSTEIN
VEHICLE DIRECTION INDICATOR.
APPLICATION FILED FEB. 21, 1921.

1,428,729.

Patented Sept. 12, 1922.

INVENTOR.
BERNARD WEINSTEIN
BY A.B.Bowman
ATTORNEYS.

Patented Sept. 12, 1922.

1,428,729

UNITED STATES PATENT OFFICE.

BERNARD WEINSTEIN, OF LOS ANGELES, CALIFORNIA.

VEHICLE DIRECTION INDICATOR.

Application filed February 21, 1921. Serial No. 446,740.

*To all whom it may concern:*

Be it known that I, BERNARD WEINSTEIN, a citizen of the United States, residing at Los Angeles, in the county of Los Angeles and State of California, have invented a certain new and useful Vehicle Direction Indicator, of which the following is a specification.

My invention relates to a device to be used in connection with a vehicle for indicating the direction the vehicle is about to take when driven about on the streets and the primary object of this invention is improvements over my patent for vehicle direction indicator issued January 4th 1921, Patent Number 1,364,334 and the objects of said improvements are: First, to provide a vehicle direction indicator of this class which is operative from the vehicle steering wheel. Second, to provide a device of this class which is easily operated in several positions for indicating the direction the vehicle is about to take. Third, to provide a device of this class with novel means for controlling the extended positions of the signal. Fourth, to provide a device of this class in which the signal may be drawn into compact or neutral form from either of two signaling positions and Fifth, to provide a device of this class which is very simple and economical of construction, durable, easy to operate, easy to install, applicable for use in connection with the various makes of self propelled vehicles now in use and which will not readily deteriorate or get out of order.

Figure 1:
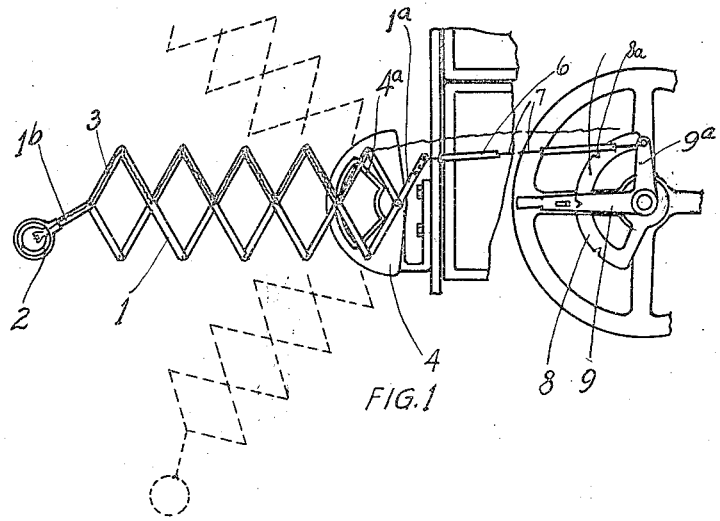
Figure 2:
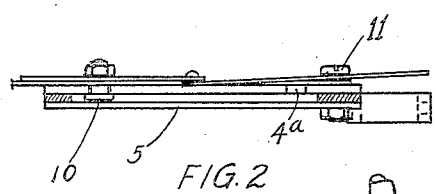
Figure 3:
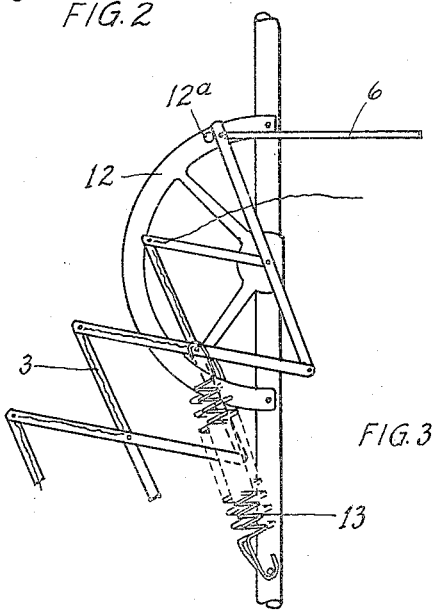

With these and other objects in view, as will appear hereinafter, my invention consists of certain novel features of construction, combination and arrangement of parts and portions as will be hereinafter described in detail and particularly set forth in the appended claims, reference being had to the accompanying drawings and to the characters of reference thereon, which form a part of this application, in which:

Figure 1 is a front side elevational view of the device in one of its operative and extended positions, and showing by dotted lines two other extended positions, and showing the device mounted on the windshield of the vehicle and showing diagrammatically the lever operating device positioned in connection with the steering wheel of the vehicle; Fig. 2 is a lower edge view of the device alone in its extended form minus the operating lever and shown on an enlarged scale, and Fig. 3 is a side elevational view of the device showing the supports and controlling means in a slightly modified form from that of Figures 1 and 2 of the drawings.

Similar characters of reference refer to similar parts and portions throughout the several views of the drawings.

The lazy tongs 1, signal 2, conductor 3, support and control 4, guard 5, flexible tube 6, wire 7, quadrant 8, lever 9, bolt 10 and bolt 11, constitute the principal parts and portions of my vehicle direction indicator in the preferred form.

The support 4 is secured to the side of the vehicle and is preferably semi-circular in form. It is provided with an endless cam groove, $4^a$ in the form of a quadrant shown best in Figure 1 of the drawings. Pivotally mounted centrally at one side on this support 4 by means of the bolt 11, is the lazy tongs 1, the bolt 11 forming the central pivot for one end of said lazy tongs, and one of said members being extended providing an arm $1^a$, which serves as a lever for operating the lazy tongs. The central bolt adjacent to the bolt 11 is a specially formed bolt 10, which is provided with an extended portion which is adapted to fit in the cam groove $4^a$, and move longitudinally in said groove, and this bolt forms the central second pivot member of the lazy tongs.

It will be noted that the central pivot members and one side pivot members of the lazy tongs members are extended and provided with holes therein which serve as supports for the electrical conductor 3, which extends with and collapses with the lazy tongs members. On the extended end of the lazy tongs members is an extended arm $1^b$ upon which is mounted the signal 2, which is preferably a guard member in which is mounted an electrical lamp, the guard member being of sufficient size, so that it is easily seen in the day time and is adapted to be lighted at night by the lamp.

Connecting with the arm $1^a$ at its extended end is a wire 7, which is reciprocably mounted in the flexible tubing 6, thus forming a Boden cable. The other end of this wire 7 connects with the extended arm $9^a$ on the lever 9. This lever 9 is pivotally mounted in connection with the steering wheel of the vehicle in connection with a stationary quadrant 8 which is provided with a plurality of notches $8^a$ which is adapted to receive a spring pawl mounted in the lever 9 and adapted to engage the notches for holding the lever 9 in three relative positions to the quadrant 8 thus supporting the lazy tongs members in three distinct predetermined positions as shown by dotted and solid lines in Fig. 1 of the drawings and operative into and out of these positions by means of the lever 9 positioned adjacent to the steering wheel.

In the modified form of construction shown in Fig. 3 of the drawings the construction is the same except the support 4 is not provided with a cam groove but with a simple semi-circular spider formed support secured to the wind-shield post end and provided with tension springs 13 extending from a position below said support on said post to the bolt 10. These springs serve to prevent the lazy tongs from being extended too far and tend to hold the support in a downward position. The support 12, is provided with a stop member 12ª adapted to engage the lever 1ª and prevents the lazy tongs member from dropping too low. It is operated by means of the lever 9 in the same manner as the structure shown in Figs. 1 and 2.

Though I have shown and described a particular construction, combination and arrangement of parts and portions and a certain modification thereof, I do not wish to be limited to this particular construction, combination and arrangement nor to the modification thereof, but desire to include in the purview of my invention the construction, combination and arrangement, substantially as set forth in the appended claims.

It is obvious that with this construction, there is provided a means operative from the steering wheel of the vehicle in which a lazy tongs member may be extended or collapsed and moving to three distinct positions as predetermined by the shape of the cam and lever quadrant and that the cam groove 4ª will control the extension of the lazy tongs and permit its collapse from either the high or low positions and that the springs 13 perform practically the same function as disclosed in Fig. 3 of the drawings.

Having thus described my invention what I claim as new and desire to secure by Letters Patent, is:

1. A device of the class described, including a lazy tongs, adapted to be extended, raised and lowered, a signal mounted on the extended end of said lazy tongs, means for pivotally supporting the opposite end of said lazy tongs, means connected with a pivotal bolt connecting two members of said lazy tongs intermediate their ends for controlling the radial and extending movement of said lazy tongs.

2. A device of the class described, including a supporting member provided with an endless cam groove, a lazy tongs with one end pivotally mounted on the said supporting member, a central pivotal bolt pivotally connecting two members of said lazy tongs intermediate their ends provided with an extended head adapted to move longitudinally in said cam groove, a signal member on the extended end of said lazy tongs and thrust and tension means for operating said lazy tongs.

In testimony whereof, I have hereunto set my hand at Los Angeles, California, this 11th day of February, 1921.

BERNARD WEINSTEIN.